United States Patent
Murthy et al.

(10) Patent No.: US 9,003,296 B2
(45) Date of Patent: Apr. 7, 2015

(54) BROWSER RENDERABLE TOOLBAR

(75) Inventors: Vinodh Kumar Chandra Murthy, Milpitas, CA (US); Chris Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1591 days.

(21) Appl. No.: 11/613,913

(22) Filed: Dec. 20, 2006

(65) Prior Publication Data
US 2008/0155425 A1 Jun. 26, 2008

(51) Int. Cl.
*G06F 3/00* (2006.01)
*G06F 9/44* (2006.01)

(52) U.S. Cl.
CPC ..................... *G06F 9/4443* (2013.01)

(58) Field of Classification Search
CPC ............... G06F 17/30873; G06F 17/30887; G06F 17/30884; G06F 3/0481
USPC ......... 715/705, 738, 739, 744, 745, 747, 749, 715/760
See application file for complete search history.

(56) References Cited

U.S. PATENT DOCUMENTS

| | | | |
|---|---|---|---|
| 5,499,335 A | 3/1996 | Silver et al. .................... 715/703 |
| 5,630,042 A | 5/1997 | McIntosh et al. .............. 715/744 |
| 5,744,787 A | 4/1998 | Teicher ......................... 235/380 |
| 5,784,058 A | 7/1998 | LaStrange et al. ............ 715/738 |
| 5,802,530 A | 9/1998 | Van Hoff ....................... 715/513 |
| 5,813,007 A | 9/1998 | Nielsen .......................... 707/10 |
| 5,848,424 A | 12/1998 | Scheinkman et al. ...... 715/501.1 |
| 5,875,296 A | 2/1999 | Shi et al. ........................... 726/5 |
| 5,877,759 A | 3/1999 | Bauer ............................ 719/317 |
| 5,883,810 A | 3/1999 | Franklin et al. ............... 700/232 |
| 5,890,172 A | 3/1999 | Borman et al. ............ 715/501.1 |
| 5,914,714 A | 6/1999 | Brown .......................... 715/866 |
| 5,917,491 A | 6/1999 | Bauersfeld ..................... 715/810 |
| 5,933,142 A | 8/1999 | LaStrange et al. ............. 715/788 |
| 5,949,419 A | 9/1999 | Domine et al. ................ 715/744 |
| 5,963,952 A | 10/1999 | Smith ............................ 707/102 |
| 5,964,836 A | 10/1999 | Rowe et al. ................... 709/221 |
| 5,974,446 A | 10/1999 | Sonnenreich et al. ........ 709/204 |
| 5,999,179 A | 12/1999 | Kekic et al. ................... 715/734 |
| 5,999,972 A | 12/1999 | Gish ............................. 709/219 |
| 5,999,973 A | 12/1999 | Glitho et al. .................. 709/223 |
| 6,000,832 A | 12/1999 | Franklin et al. ............... 700/232 |
| 6,006,034 A | 12/1999 | Heath et al. ................... 717/170 |

(Continued)

FOREIGN PATENT DOCUMENTS

| WO | WO 00/25239 | 5/2000 | .............. G06F 17/30 |
| WO | WO 01/95104 | 12/2001 | ................ G06F 9/45 |

(Continued)

OTHER PUBLICATIONS

Alexa Internet Website. Archived Feb. 9, 1998 at http://web.archive.org.

(Continued)

*Primary Examiner* — Thanh Vu
(74) *Attorney, Agent, or Firm* — James J. DeCarlo; Greenberg Traurig, LLP

(57) ABSTRACT

A method of creating a browser renderable toolbar or helper application, and a network architecture therefore. The browser renderable toolbar obviates the need for separately-installed software while still permitting a user to take advantage of the functionality provided by a traditional toolbar.

41 Claims, 6 Drawing Sheets

(56) References Cited

U.S. PATENT DOCUMENTS

| | | | |
|---|---|---|---|
| 6,009,459 A | 12/1999 | Belfiore et al. | 709/203 |
| 6,020,884 A | 2/2000 | MacNaughton et al. | 715/747 |
| 6,025,836 A | 2/2000 | McBride | 715/750 |
| 6,026,435 A | 2/2000 | Enomoto et al. | 709/217 |
| 6,034,683 A | 3/2000 | Mansour et al. | 715/764 |
| 6,057,836 A | 5/2000 | Kavalam et al. | 715/779 |
| 6,061,695 A | 5/2000 | Slivka et al. | 715/513 |
| 6,072,486 A | 6/2000 | Sheldon et al. | 715/835 |
| 6,101,486 A | 8/2000 | Roberts et al. | 705/27 |
| 6,119,098 A | 9/2000 | Guyot et al. | 705/14 |
| 6,141,010 A | 10/2000 | Hoyle | 715/854 |
| 6,188,995 B1 | 2/2001 | Garst et al. | 705/59 |
| 6,208,995 B1 | 3/2001 | Himmel et al. | 707/104.1 |
| 6,216,153 B1 | 4/2001 | Vortriede | 709/203 |
| 6,226,655 B1 | 5/2001 | Borman et al. | 715/501.1 |
| 6,232,972 B1 | 5/2001 | Arcuri et al. | 715/815 |
| 6,256,668 B1 | 7/2001 | Slivka et al. | 709/220 |
| 6,262,731 B1 | 7/2001 | Hasegawa | 715/764 |
| 6,266,058 B1 | 7/2001 | Meyer | 715/733 |
| 6,282,548 B1 | 8/2001 | Burner et al. | 707/104.1 |
| 6,292,185 B1 | 9/2001 | Ko et al. | 715/763 |
| 6,300,947 B1 * | 10/2001 | Kanevsky | 715/866 |
| 6,314,451 B1 | 11/2001 | Landsman et al. | 709/203 |
| 6,360,255 B1 | 3/2002 | McCormack et al. | 709/221 |
| 6,373,507 B1 | 4/2002 | Camara et al. | 715/825 |
| 6,407,754 B1 | 6/2002 | Hetherington et al. | 715/765 |
| 6,433,800 B1 | 8/2002 | Holtz | 715/835 |
| 6,460,058 B2 | 10/2002 | Koppolu et al. | 715/738 |
| 6,469,713 B2 | 10/2002 | Hetherington et al. | 715/740 |
| 6,483,525 B1 | 11/2002 | Tange | 715/765 |
| 6,486,892 B1 | 11/2002 | Stern | 715/760 |
| 6,493,000 B1 | 12/2002 | Wynn et al. | 715/733 |
| 6,496,203 B1 | 12/2002 | Beaumont et al. | 715/762 |
| 6,505,238 B1 | 1/2003 | Tran | 709/208 |
| 6,542,897 B2 | 4/2003 | Lee | 707/102 |
| 6,549,217 B1 | 4/2003 | De Greef et al. | 715/745 |
| 2001/0035885 A1 | 11/2001 | Iron et al. | 715/855 |
| 2002/0057299 A1 | 5/2002 | Oren et al. | 715/825 |
| 2002/0075326 A1 | 6/2002 | Allen | 715/853 |
| 2002/0077978 A1 | 6/2002 | O'Leary et al. | 705/40 |
| 2002/0078095 A1 | 6/2002 | Culham | 715/516 |
| 2002/0089549 A1 | 7/2002 | Munro et al. | 715/835 |
| 2002/0097277 A1 | 7/2002 | Pitroda | 715/854 |
| 2002/0149615 A1 | 10/2002 | Rajarajan et al. | 715/738 |
| 2002/0149618 A1 | 10/2002 | Estrada et al. | 715/760 |
| 2002/0154159 A1 | 10/2002 | Day et al. | 715/738 |
| 2002/0158912 A1 | 10/2002 | O'Rourke | 715/810 |
| 2002/0163544 A1 | 11/2002 | Baker et al. | 715/835 |
| 2002/0163545 A1 | 11/2002 | Hii | 715/838 |
| 2002/0186239 A1 | 12/2002 | Komuro | 715/738 |
| 2002/0186249 A1 * | 12/2002 | Lu et al. | 345/781 |
| 2002/0186255 A1 | 12/2002 | Shafron et al. | 715/810 |
| 2002/0186256 A1 | 12/2002 | Hong | 715/817 |
| 2003/0009768 A1 | 1/2003 | Moir | 725/112 |
| 2003/0011641 A1 | 1/2003 | Totman et al. | 715/810 |
| 2003/0028764 A1 | 2/2003 | Campbell | 713/156 |
| 2003/0067481 A1 | 4/2003 | Chedgey et al. | 715/738 |
| 2003/0080995 A1 * | 5/2003 | Tenenbaum et al. | 345/738 |
| 2003/0085916 A1 | 5/2003 | Thiry et al. | 715/738 |
| 2003/0085927 A1 | 5/2003 | Muller | 715/810 |
| 2003/0112271 A1 | 6/2003 | Batalden et al. | 715/744 |
| 2003/0112280 A1 | 6/2003 | Driskell | 715/835 |
| 2003/0128233 A1 | 7/2003 | Kasriel | 715/738 |
| 2008/0098300 A1 * | 4/2008 | Corrales et al. | 715/243 |

FOREIGN PATENT DOCUMENTS

| | | | |
|---|---|---|---|
| WO | WO 03/038554 | 5/2003 | |
| WO | WO 03/038640 | 5/2003 | G06F 15/16 |

OTHER PUBLICATIONS

Using Microsoft Internet Explorer 4. Eric Ladd and Jim O'Donnell. Que Corporation. 1997. pp. 42 and 43.

Alexa Accessorizes Browsers. Alex Lash. CNET News.com. Sep. 22, 1997. http://news.com.com/2100-1001-203484.html.

"As Go Surfers, So Goes Alexa". Wired News. Jul. 24, 1997. http://www.wired.com/news/technology/0,1282,5427,00.html.

"Alexa Archives the Internet". Bart Eisenberg. Copyright 1997. http://www.gihyo.co.jp/magazine/SD/pacific/SD.sub.--9711.html.

"A Must-See Browser Add-On". Jesse Berst. ZDNet AnchorDesk. Sep. 16, 1998. http://www.zdnet.com/anchordesk/story/story.sub.--2543.html.

"Band Objects", Microsoft Corporation, Copyright 1997.

"Browser Extensions", MSDN, Copyright 2004, http://msdn.microsoft.com/library/default.asp?url=/workshop/browser/ext/overview/overview.asp.

"Creating Custom Explorer Bars, Tool Bands, and Desk Bands", MSDN, Copyright 2004, http://msdn.microsoft.com/library/default.asp?url=/library/en-us/shellcc/-platform/Shell/programmersguide/shell.sub.--adv/bands.asp.

"Developers Get Early IE 5", Wired News, Jun. 11, 1998, http://www.wired.com/news/print/0,1294,12936,00.html.

"Introduction", XUL Programmer's Reference Manual, Last Updated: Apr. 5, 2001, http://www.mozilla.org/xpfe/xulref/.

"Netscape 6 Preview Release 1", NT Compatible, Apr. 5, 2000, http://www.ntcompatible.com/story322.html.

"Plug-in Guide", DevEdge Online Documentation, Jan. 1998, Chapter 1, http://developer.netscape.com/docs/manuals/communicator/plugin/index.htm.

"Subject: Add toolbar to IE4-taskbar", Google Groups, Jan. 26, 1999, http://groups.google.com/groups?hl=en&lr=&ie=UTF-8&oe=UTF-8&threadm=36ae2-a57.3471779%40news.uni-stuttgart.de&rnum=9&prev=/groups%3Fhl%3Den%26lr%3D%-26ie%3DUTF-8%26oe%3DUTF-8%26q%3Dtoolbar%2Bin%2Bie4.

"Subject: Add Toolbar (Plugin) in Netscape Communicator", Google Groups, May 18, 2000, http://groups.google.com/groups?hl=en&lr=&ie=UTF-8&oe=UTR-8&threadm=8gp8t-5%241abl%40secnews.netscape.com&rnum=23&prev=/groups%3Fq%3Dcustom%2Btoolba-rs%2Bin%2Bnetscape%2B6%26start%3D20%26hl%3Den%26lr%3D%26ie%3DUTF-8%26oe%3D-UTF-8%26selm%3D8gp8t5%25241abl%2540secnews.netscape.com%26rnum%3D23.

"Subject: Custom Toolbar for Netscape Browser", Google Groups, May 15, 2001, http://groups.google.com/groups?hl=en&lr=&ie=UTF-8&oe=UTF-8&threadm=3B0177FD.BE89042B%40univ.ox.ac.uk&rnum=2&prev=/groups%3Fhl%3Den%26lr%3D%2-6ie%3DUTF-8%26oe%3DUTF-8%26q%3Dcustom%2Bnetscape%2B6%2Btoolbar%2B-button%2- B-personal.

"Subject: How the Hell ????", Google Groups, Jun. 6, 2000, http://groups.google.com/groups?hl=en&lr=&ie=UTF-8&oe=UTF-8&threadm=8hln7-u%24fb53%40secnews.netscape.com&rnum=11&prev=/groups%3Fq%3Dadding%2Btoolba-rs%2Bin%2Bnetscape%2B6%26start%3D10%26hl%3Den%26lr%3D%26ie%3DUTF-8%26oe%3D-UTF-8%26selm%3D8h1n7u%2524fb53%2540secnews.netscape.com%26rnum%3D11.

"Subject: How to add toolbar like Yahoo companion in IE", Google Groups, Sep. 30, 1999, Messages 1-10, http://groups.google.com/groups?hl=en&lr=&ie=UTF-8&oe=UTF-8&threadm=OWImH-%246C%24GA.227%40cppssbbsa02.microsoft.com&rnum=88&prev=/groups%3Fq%3Dtool-bar%2Bin%2Bie4%26hl%3Den%26lr%3D%26ie%3DUTF-8%26oe%3DUTF-8%26start%3D80%26-sa%3DN.

"Subject: How to add toolbar like Yahoo companion in IE", Google Groups, Oct. 1, 1999, Messages 11-14, http://groups.google.com/groups?h1=en&lr=&ie=UTF-8&oe=UTF-8&threadm=7tdbf-a%247j9%241%40nnrpl.deja.com&rnum=2&prev=/groups%3Fhl%3Den%26ie%3DUTF-8%26-oe%3DUTF-8%26q%3Dtool%2Bband%2Bin%2Bie4%26spell%3D1.

"Subject: IE4 Band Objects", Google Groups, Mar. 22, 1998, http://groups.google.com/groups?hl=en&lr=&ie=UTF-8&oe=UTF-8&threadm=3524f-417.0%40news1.cityweb.de&rnum=1&prev=/groups%3Fhl%3Den%26lr%3D%26ie%3DUTF--8%26oe%3DUTF-8%26q%3D%2522communication%2Bbands%2522%2Bie4.

"Subject: Plugins for IE", Google Groups, Sep. 30, 2000, http://groups.google.com/groups?hl=en&lr=&ie=UTF-8&oe=UTF-8

(56) References Cited

OTHER PUBLICATIONS

&threadm=Ojkp2-jxLAHA.243%40cppssbbsa04&rnum=24 &prev=/groups%3Fq%3Dplugin%2Bgroup:microso-ft.public. inetexplorer.ie4.activex.sub.--contrl%26h1%3Den%261r%3D%26ie%3DU-TF-8%26oe%3DUTF-8%26group%3Dmicrosoft.public. inetexplorer.ie4.activex.sub.---contrl%26start%3D20%26sa%3DN.
"Subject: Toolbar like IE4", Google Groups, Apr. 23, 1998, http://groups.google.com/groups?hl=en&lr=&ie=UTF-8&oe=UTF-8 &threadm=eyzHG-4qb9GA.136%40uppssnewspub05.moswest. msn.net&rnum=6&prev=/groups%3Fhl%3Den%-261r%3D%26ie%3DUTF-8%26oe%3DUTF-8%26q%3Dtoolbar%2Bin%2Bie4.
"Subject: Whats the deal with Yahoo Companion? Standard plugin API or not?", Google Groups, Jan. 12, 2000, http://groups.google.com/groups?hl=en&lr=&ie=UTF-8&oe=UTF-8&threadm=387D2-25C.E3796E7C%40sympatico.ca&rnum=2&prev=/groups%3Fhl%3Den%261r%3D%26ie%3DU-TF-8%26oe %3DUTF8%26q%3Dcustom%2Btoolbar%26btnG%3DGoogle %2BSearch%26meta%3-Dgroup%253Dnetscape.devs-plugins.
Flanagan, David, "Netscape 6.0 Released", O'Reilly, Nov. 16, 2000, http://www.oreillynet.com/pub/a/oreilly/news/flanagan3.sub.__ 1100.html.
Galli, Marcio, "The DevEdge RSS-News Ticker Toolbar", Netscape DevEdge, Jul. 14, 2003, http://devedge.netscape.com/viewsource/ 2003/rss-toolbar-ticker/.
Jimmy, "Netscape 6.0 Preview Release 2 Review—Good Software, Bad Timing", Jimmy's World, Aug. 9, 2000, http://www.jim-mysworld.org/opinions/netscape-6.0-pr2.html.
Mace, Thomas, "PowerBrowser", PC Magazine, vol. 15, No. 5, p. 132(1), Mar. 12, 1996.
Mann, Alex and Hecht Kevin, "DevEdge Newsgroup FAQ: Client Technical", DevEdge Online Archive, Last Updated: Dec. 15, 1998, http://developer.netscape.com/support/faqs/champions/client_tech. html.
Mendelson, Edward, "Wake Up Your Web Site", PC Magazine, vol. 17, No. 11, p. 60(2), Jun. 9, 1998.
Roberts, Scott, "Programming Microsoft Internet Explorer 5", Jul. 1999, pp. 3-16, 383-423, 461-475, Microsoft Press, USA.
Summers, Jason, "Plug-ins Newsgroup FAQ: Plug-ins", DevEdge Online Archive, Last Updated: May 26, 1999, http://developer. netscape.com/support/faqs/plugins/general.html.
Alexa, Alexa Toolbar Version 1.4.1, Copyright 1998, [Note: Setup File Available on Enclosed CD in Folder Entitled "Alexa Setup," also available at http://ftp3.ru.freebsd.org/pub/pc/windows/WinSock/IE/ at hyperlink alexaSetupl4m.exe.
International Preliminary Examination Report for International Application No. PCT/US01/16993, Mar. 5, 2003.
International Preliminary Examination Report for International Application No. PCT/US99/25332, Jul. 29, 2002.
International Search Report for International Application No. PCT/ US01/16993, Oct. 25, 2001.
International Search Report for International Application No. PCT/ US02/34509, Oct. 28, 2003.
International Search Report for International Application No. PCT/ US02/34510, Jan. 31, 2003.
International Search Report for International Application No. PCT/ US99/25332, Feb. 2, 2000.
International: Written Opinion for International Application No. PCT/US02/34510, Sep. 26, 2003.
Trupin, "The Visual Programmer puts Active X Document Objects Through Their Paces", Microsoft Systems Journal, v11, n6, p. 55(16), Jun. 1996.
"Client/Server and Host Application Development Tools", DBMS, v9, n6, p. 27(10), Jun. 15, 1996.
Childers, "Delphi Client/Server Suite", PC Magazine, v15, n1, p. 207(3), Sep. 10, 1996.
Persky, "HTML goes WYSIWYG: Two Mac-based Editors", LAN Magazine, v12, n3, p. 121(5), Mar. 1997.
Evans, "Extend Client/Server Apps to the Web", Data Based Advisor, v15, n3, p. 52(6), Mar. 1997.
Finn, "Add Control to your Intranet", Databased Web Advisor, v15, n8, p. 56(3), Aug. 1997.
Wong, "Meeting on the Internet in 10 Minutes", Network, v12, n12, p. 131(4), Nov. 1997.
Faison, "The New HTML Help System Extends Online Help From the Desktop to the Web", Microsoft Systems Journal, v13, nl, p. 55(14), Jan. 1998.
Alwang, "Meeting of the Minds", PC Magazine, v17, n4, p. 179(10), Feb. 24, 1998.
Walter, "Acrobat 4: Adobe's Bid to Make it More than Just a Viewer", Seybold Report on Internet Publishing, 3, 7, NA(1), Mar. 1999.

\* cited by examiner

BROWSER RENDERABLE TOOLBAR

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The instant disclosure relates to the field of network browsing application enhancements, and more specifically provides a helper application, such as a toolbar, that can be rendered by a conventional network browsing application.

BACKGROUND

One of the single biggest drivers that has contributed to the explosive adoption and expansion of the Internet is the World Wide Web and the network browsing applications, or browsers, used to view information accessible on the World Wide Web. At its most basic, the World Wide Web, or web, is a collection of documents written using a well-structured language such as that defined in the HyperText Markup Language ("HTML") specification, the eXtensible Markup Language ("XML") specification, or other such specifications. Browsers can read such documents and render them, such that they are more easily read and understood by users.

The increasing adoption of browsers by users has also spurred the introduction of add-ons, plug-ins, or other helper applications which further enhance the browser's capabilities. Helper applications are separate, compiled applications which must be downloaded and installed on an individual computing device on which the browser is operating, but which integrate into the browser. As a downloadable application, the helper application can become out of date, requires download and re-installation when new features or functionality are added, and could have issues of browser compatibility with newer and/or older browser versions. As a piece of software, the helper application also needs to be compatible with other software. When incompatible versions of other software are encountered, a forced download of alternative versions of the helper application may be required to ensure compatibility. Such alternative helper application versions may not contain all of the latest features and functions associated with the helper application, and therefore may not be as desirable for the user.

In addition, settings for the helper application are frequently configured on a per computer basis. When a user uses a computer or other computing device other than his or her main computer, the helper application may either not exist at all or may need to be installed, and if it is installed, it frequently does not conform to the user's preferences.

An example of a helper application is the well-known downloadable toolbar. When installed, the downloadable toolbar allows users to customize their browsing experience and to have such a customized experience follow them from computing device to computing device. By way of example, such toolbars typically allow users to easily add entries to, remove entries from, and organize a list of their favorite web sites. Such toolbars can also notify users when a new E-mail has arrived, facilitates access to commonly used web sites and/or features, and allows users to easily search for information of interest directly from the browser's main window.

SUMMARY

While helper applications can be very useful, many Systems Administrators prohibit the use of such applications within organizations because of security and other concerns. What is needed is a means by which some or all of a helper application's functionality can be implemented within a browser, thereby obviating the need for a separately installed helper application. Accordingly, the instant disclosure is directed to a browser renderable toolbar that substantially obviates one or more of the problems due to limitations and disadvantages of the related art. Although described herein as a toolbar, alternative helper application embodiments are contemplated.

An embodiment comprises a method for presenting a toolbar to a user through a browser comprising embedding code into a downloadable document comprising browser interpretable commands, the commands, when interpreted by a browser, causing the browser to render, within a content display area of the browser, a user toolbar, the functions of which are defined by said code; and serving said document. Such an embodiment may further comprise receiving identification information from a user; performing user authentication based on the received identification information to determine an appropriate user account associated with the user; and, incorporating preferences, including, without limitation, a set of favorite web sites, associated with the appropriate user account into the downloadable document. The embedded code may further take into account capabilities of the device and/or browser. In an embodiment, the capabilities may be taken into account by omitting certain features or functions that would otherwise be present. The browser interpretable commands may comprise commands written in XML, AJAX, JavaScript, VBScript, or other such non-compiled languages. The browser interpretable commands may further comprise instructions for facilitating searching of network-accessible documents, including documents available via the Internet.

An embodiment comprises a method of creating a toolbar capable of being rendered by a browser running on a device, comprising determining a set of toolbar preferences; defining browser interpretable commands, wherein the browser interpretable commands, when interpreted by a browser, cause the browser to render a toolbar configured according to the helper application preferences within a browser content display area, and wherein the browser interpretable commands, when interpreted by the browser, cause the browser to incorporate the toolbar into the content display area as additional content is displayed by the browser; and, transmitting the browser interpretable commands to a device. The method may further comprise receiving identification information from a user; performing user authentication based on the received identification information to determine an appropriate user account associated with the user; and, modifying the set of toolbar preferences based on preferences associated with the appropriate user account. The user authentication step may be repeated at least once if the user authentication step fails, and a default user account may be utilized if authentication subsequently fails.

An embodiment may further comprise browser interpretable commands for implementing a helper application, comprising a set of commands defining the appearance of the helper application; a set of commands defining a plurality of user interface elements; and, a set of commands whereby the browser renders the helper application as part of each subsequent page displayed by the browser. The appearance definition and/or the user interface element definition may comprise at least one background image. Each user interface element definition may further comprise at least one of the set of a URL and additional browser interpretable commands.

An embodiment comprises a method of controlling an Internet browser content display area on a display of a device, and enabling a user of the device and Internet browser to access and navigate the Internet and to receive and display one or more Web pages from one or more Internet sites, including the display of a Web page from a predetermined Internet site, the Internet browser having a bounded user interface area, the Internet browser further having a bounded content display area for displaying Web pages, the content display area being a separate area from the user interface area of the browser, said method comprising the steps of: (a) providing, at the predetermined Internet site, access to a browser interpretable web page for generating an Internet browser toolbar; and (b) downloading from the predetermined Internet site said web page, wherein said web page, when interpreted by the browser, adjusts the bounds of the content display area if necessary and causes the display, within the bounds of the content display area, of a user toolbar that, by virtue of the web page, is added to and appears in and remains entirely within the bounds of the content display area without overlying anything that was displayed in the bounds of the user interface area of the browser prior to downloading and without overlying any other content in the content display area, said user toolbar making additional functionality that is not part of the Internet browser prior to download available to the user after download, such that once the user toolbar is displayed the user toolbar remains displayed within the bounds of the content display area and said additional functionality remains available to the user regardless of a subsequent Internet site to which the Internet browser is caused to navigate after download. In an embodiment, the browser user interface area also may comprises an address window in which a user can enter a web site addresses to which the user desires the browser to navigate, and wherein the user interface element is a search window, independent of the address window and independent of any search capability of the browser prior to download of the web page, which search window enables the user to enter a search term in the search window and initiate a search at the predetermined Internet site or another Internet site regardless of the Internet site to which the device is connected via the browser at the time the search is initiated or what web site address is present in the address window at the time the search is initiated. An embodiment may further comprise the step of making available for downloading by the predetermined Internet site additional information specific to the user of the device and Internet browser, for defining all or part of the user toolbar, and wherein all or part of the display of the user toolbar is dependent upon the downloaded additional information.

An embodiment may comprise a browser interpretable document for rendering by a browser on a display of a device, the Internet browser facilitating connection between the device and one or more Internet sites including a predetermined Internet site, the Internet browser comprising a defined user interface portion and a defined content display portion, the Internet browser further facilitating displaying on a display of the device and in the defined content display portion one or more Web pages from the one or more Internet sites, including displaying of Web pages from the predetermined Internet site, comprising browser interpretable commands, whereby said Internet browser content display portion, after being enabled with new functionality via navigation to and download of the browser interpretable document from said predetermined Internet site and interpretation of the browser interpretable commands, comprises a persistent user toolbar which does not overly anything displayed in the user interface portion prior to the user toolbar being enabled, and whereby the persistent user toolbar is displayed so as to create the visual impression that the user toolbar is an integrated part of the Internet browser user interface, the user toolbar providing additional functionality to the user regardless of which one of said one or more Internet sites the device is connected to via the Internet browser.

An embodiment may comprise a system for controlling an Internet browser displayable on a display of a device, said system comprising a server, said server comprising a web page comprising browser interpretable instructions which are accessible over the Internet by a user of the device, wherein the web page comprises instructions for controlling a browser content display area; and said web page further comprising browser interpretable instructions interpretable by an Internet browser, said Internet browser having a bounded web content display area, the Internet browser further having a bounded user interface area, the content display area being separate from the user interface area of the browser, said browser interpretable instructions, when said web page is interpreted, causing the display, within the bounds of the browser web content display area, of a user toolbar that, by virtue of its being downloaded, appears in and remains entirely within the bounds of the browser web content display area, said user toolbar making additional functionality that is not part of the Internet browser prior to download available to the user after download, such that once the user toolbar is displayed said additional functionality remains available to the user regardless of a subsequent Internet site to which the Internet browser is caused to navigate after download.

Additional features and advantages will be set forth in the description which follows, and in part will be apparent from this disclosure, or may be learned by practice. The objectives and other advantages will be realized and attained by the structure particularly pointed out in this written description, including any claims contained herein and the appended drawings.

It is to be understood that both the foregoing general description and the following detailed description are exemplary and explanatory and are intended to provide further explanation of the disclosed browser renderable toolbar.

BRIEF DESCRIPTION OF THE DRAWINGS

The accompanying drawings, which are included to provide a further understanding of the disclosed browser renderable toolbar and are incorporated in and constitute a part of this specification, illustrate various embodiments and, together with the description, serve to explain the principles of at least one embodiment of the disclosed browser renderable toolbar.

In the drawings.

DETAILED DESCRIPTION

Reference will now be made in detail to embodiments of the disclosed browser renderable toolbar, examples of which are illustrated in the accompanying drawings.

Figure 1:
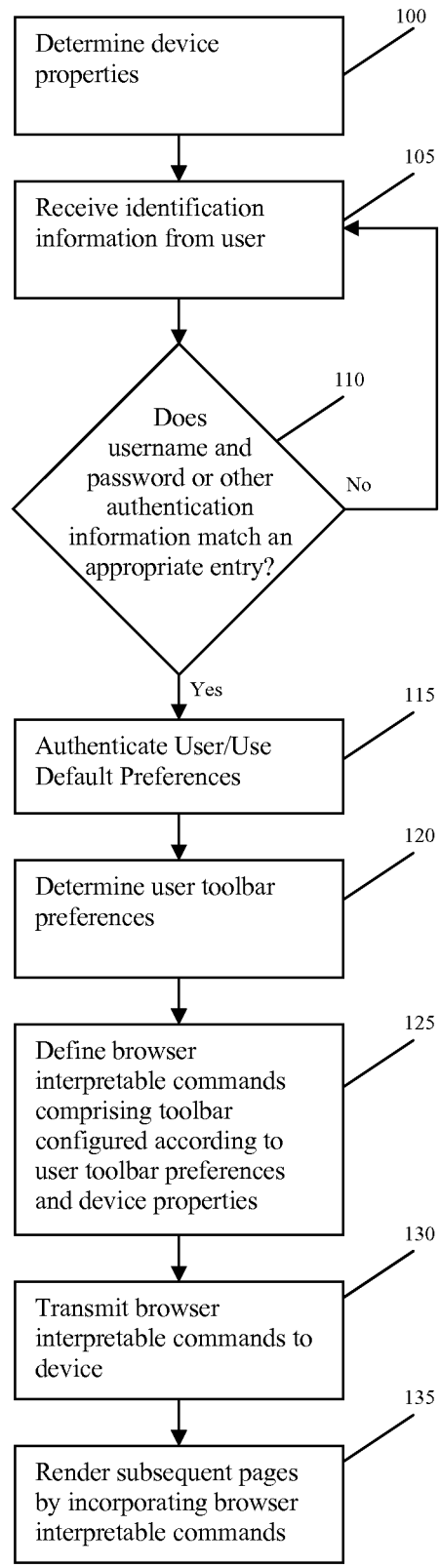
FIG. 1 is a block diagram illustrating a method by which a browser renderable toolbar can be created.

FIG. 1 is a block diagram illustrating a method by which a browser renderable toolbar can be created. In block 100, the properties of the device on which the browser is running can be determined. Such properties may include, but are not limited to, the device's display resolution capabilities, communications connection speed, available storage space, computing speed or relative computing speed, browser type and version, and the like.

In block 105, the system receives identification information from a user. By way of example, without limitation, the user may enter such information into a traditional login screen rendered by the browser running on the device; the user may present a thumb, iris, face, or other biometrically readable attribute for identification; or the device on which the browser is running, or the browser itself or a helper application associated therewith, may supply the identification information on the user's behalf.

In block 110, the supplied user identification information is compared against an authentication database or otherwise authenticated. If the user is positively identified (block 115), and thus authenticated, the user's preferences are obtained from a database of such preferences (block 120). If the user is not properly authenticated, the authentication process repeats a set number of times. If the user fails to authenticate, or if the user chooses not to provide user identification information, the system can obtain default user preferences.

In block 125, a set of browser interpretable commands or instructions are defined, wherein the browser interpretable commands comprise instructions which allow the browser to render a toolbar. In an embodiment, the rendered toolbar may comprise a search box, a pop-up blocker, and an anti-spyware scanner, as well as user interface elements facilitating accessing frequently used services such as, without limitation, E-mail and games. Such browser interpretable instructions may be written in any of a variety of languages interpretable by a browser either natively or in combination with an appropriate "engine", including, without limitation, HTML, XML, JavaScript, Visual Basic Script, and Flash, distributed by Adobe Systems Incorporated of San Jose, Calif.

The toolbar may further include one or more user interface elements facilitating altering the toolbar's appearance. By way of example, without limitation, such appearance alterations may be accomplished by applying a "skin" to the toolbar, and by adding and/or removing user interface elements, such as, without limitation, buttons, drop-down boxes, and fields, to the toolbar. In an embodiment, browser interpretable commands permit the toolbar to also incorporate the user preferences. By way of example, without limitation, such user preferences may include a list of the user's favorite web sites, frequently used E-mail addresses and/or other contract information, and the like. Such functionality is described in more detail, below.

In an embodiment, the content, appearance, and/or functionality provided by the toolbar can be tailored based on the properties of the device on which the browser is running, or by the properties of the browser itself. By way of example, without limitation, a browser running on a laptop or desktop computer may receive browser interpretable commands for creating a full-featured toolbar, while a browser running on a cellular telephone may receive browser interpretable commands for creating a toolbar with only a subset of the features and/or capabilities of the full-featured toolbar. In an embodiment, the features available in the toolbar for the cellular telephone may be chosen such that only a limited portion of the browser's display is occupied, thereby permitting users to more easily view content while still facilitating access to the toolbar and the features provided thereby.

In block 130, the browser interpretable commands are transmitted to the device. Such transmission may be accomplished through a variety of means, including, without limitation, utilizing the HyperText Transfer Protocol ("HTTP"), File Transfer Protocol ("FTP"), Short Message Service ("SMS"), or the like. In block 135, the browser can incorporate the browser interpretable commands into each subsequent page rendered by the browser, thereby permitting the user to access the toolbar regardless of which web site the user is browsing.

Figure 2:
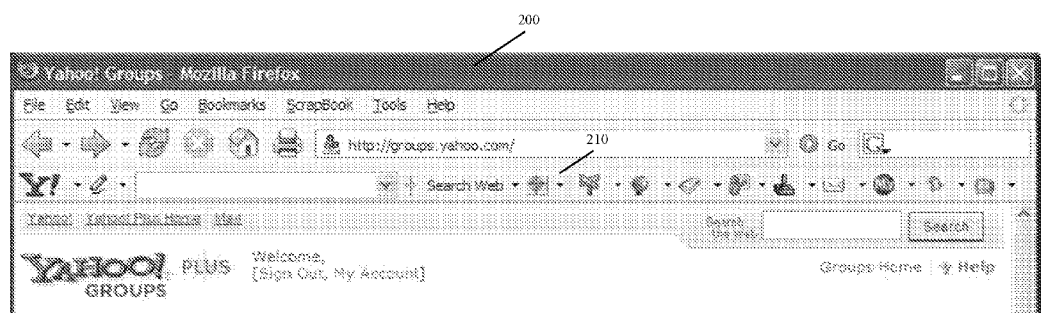
FIG. 2 is an example illustrating a browser into which a conventional toolbar has been installed.

FIG. 2 is a screen capture illustrating browser 200 into which conventional toolbar 210 has been installed. As FIG. 2 illustrates, conventional toolbar 210 appears integrated into and appears to be part of the user interface portion of browser 200.

Figure 3:
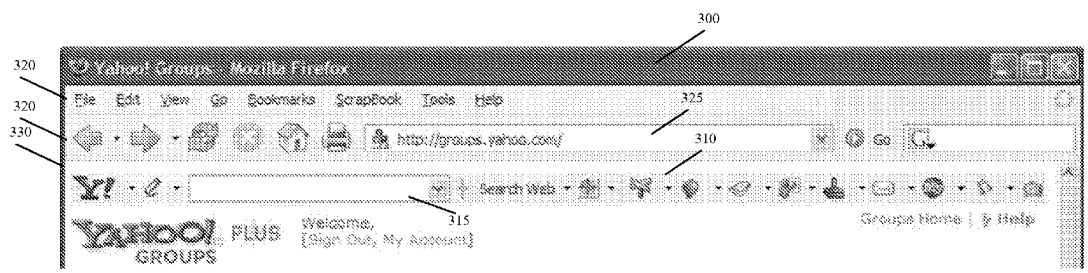
FIG. 3 is an example illustrating a browser in which a toolbar has been rendered by the browser.

FIG. 3 is an exemplary screen capture illustrating browser 300 in which toolbar 310 has been rendered by browser 300. In an embodiment, the user indicates a desire to access the features provided by a browser rendered toolbar by simply visiting a particular web site, such as, without limitation, http://toolbar.yahoo.com. By visiting such a web site, the browser can load the instructions necessary to render toolbar 310. The user can also enter login information, and by so doing permit a version of toolbar 310 to be loaded that has been customized based on the user's preferences. In the embodiment illustrated in FIG. 3, after the appropriate commands have been received by browser 300, browser rendered toolbar 310 presents a user interface that is similar to that of toolbar 210 of FIG. 2, however, browser rendered toolbar 210 is rendered within content display area 330 of browser 300, rather than browser 300's user interface area 320.

In the embodiment illustrated in FIG. 3, the instructions implementing browser rendered toolbar 310 are written using Asynchronous JavaScript and XML ("AJAX"). Ajax combines several programming tools including JavaScript, dynamic HTML ("DHTML"), XML, cascading style sheets ("CSS"), the Document Object Model ("DOM"), and the like. Ajax allows content on Web pages to update immediately when a user performs an action, unlike an HTTP request, during which users must wait for a whole new page to load. Ajax uses an engine that acts as an intermediary between a user's browser and the server from which it is requesting information. Instead of loading a traditional Web page, the user's browser loads the Ajax engine, which displays the page the user sees. The engine continues to run in the background, using JavaScript to communicate with the Web browser. User input or clicking on the page sends a JavaScript call to the Ajax engine, which can respond instantly in many cases. If the engine needs additional data, it requests it from the server, usually using an HTML or XML-based request, while it is simultaneously updating the page.

Figure 4:
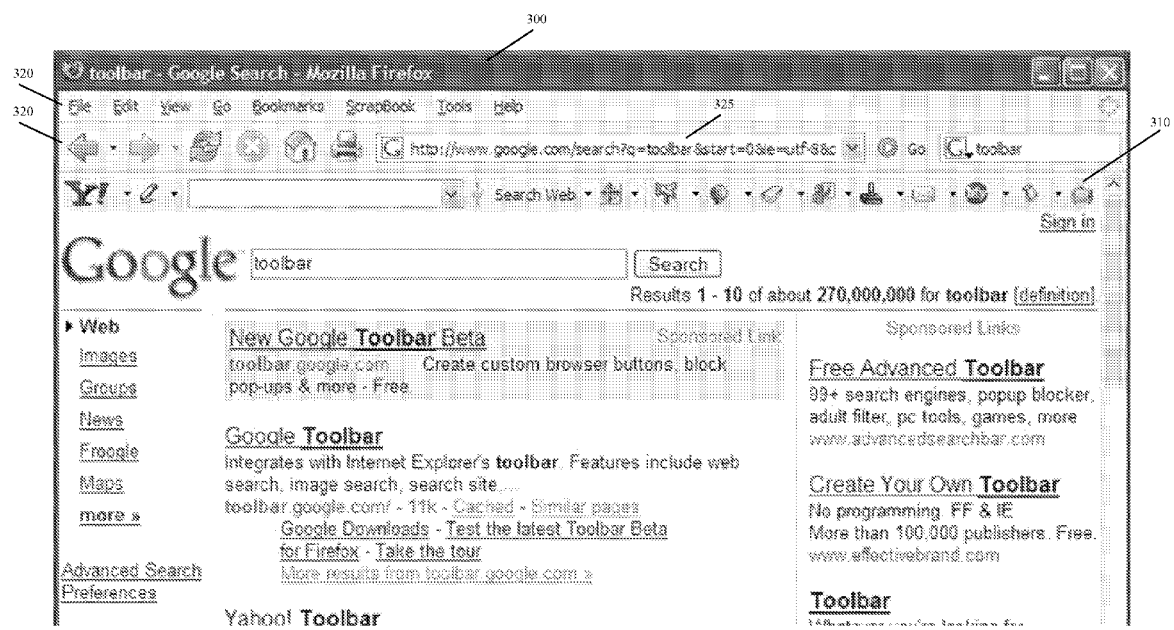
FIG. 4 is an example illustrating a browser wherein the toolbar has been rendered even after the user has navigated away from a helper application instantiation site.

In an Ajax-implemented embodiment, the Ajax engine can be instructed to always incorporate browser rendered toolbar 310 into each page that is loaded. This is illustrated in FIG. 4, wherein toolbar 310 has been rendered even after the user has navigated away from a toolbar instantiation site, as indicated by the address in address window 325. In an embodiment, this can be accomplished by the instructions implementing the browser rendered toolbar instructing the Ajax engine to display content in a frame within the browser's content display area. This obviates the need to re-render the toolbar each time the browser displays new content.

In an embodiment, such as that illustrated in FIGS. 3 and 4, it may be advantageous for the toolbar to have an appearance similar to that of a conventional toolbar, and to incorporate features such as search window 315. In such an embodiment, the browser-rendered toolbar can be loaded as an iFrame, or inline frame, within the browser. In an embodiment, the browser-rendered toolbar could be rendered as an Object within the browser's content display area, or by modifying the DOM tree associated with the loaded page.

Figure 5:
FIG. 5 is an example illustrating an alternative browser renderable toolbar embodiment.

In an embodiment, the user can determine where browser-rendered toolbar 310 is displayed. Such display may occur within browser 300 as illustrated in FIG. 3, or browser 300 can launch a separate window comprising the toolbar in the event the user prefers the helper application to be rendered separate from browser 300, as illustrated in FIG. 5.

In an embodiment, alternative toolbar user interfaces may be substituted for that illustrated in FIGS. 3 and 4. In the embodiment illustrated in FIG. 5, a "skin" has been applied to toolbar 510. Such a skin can be created by a user and saved to one or more centralized locations for subsequent access. By creating a skin, the user can customize both the appearance and content of toolbar 510 as toolbar 510 is rendered within browser content display area 530. By way of example, without limitation, a customized toolbar interface may be created for a specific purpose, such as Bay Area Travel toolbar 510 illustrated in FIG. 5. In such an embodiment, the toolbar may contain links to the user's favorite local restaurant, an annotated interactive map of the San Francisco Bay area, and music by local artists, as well as user interface elements facilitating access to frequently used tools such as E-mail and search window 535.

In an embodiment, the user interface customizations can be facilitated via a separate web site. Such a web site can permit users to drag and drop user interface elements corresponding to frequently used features and/or links onto a background image. In an embodiment, the background image and/or images associated with one or more of the user interface elements may be dynamic, rather than the static images used in conventional helper applications. The web site may also permit users to rearrange the user interface elements, and substitute different background images, thereby giving the user the ability to truly customize the helper application to the user's preferences. In an embodiment, the background image may be periodically updated, such as by a photo-sharing service.

Figure 6:
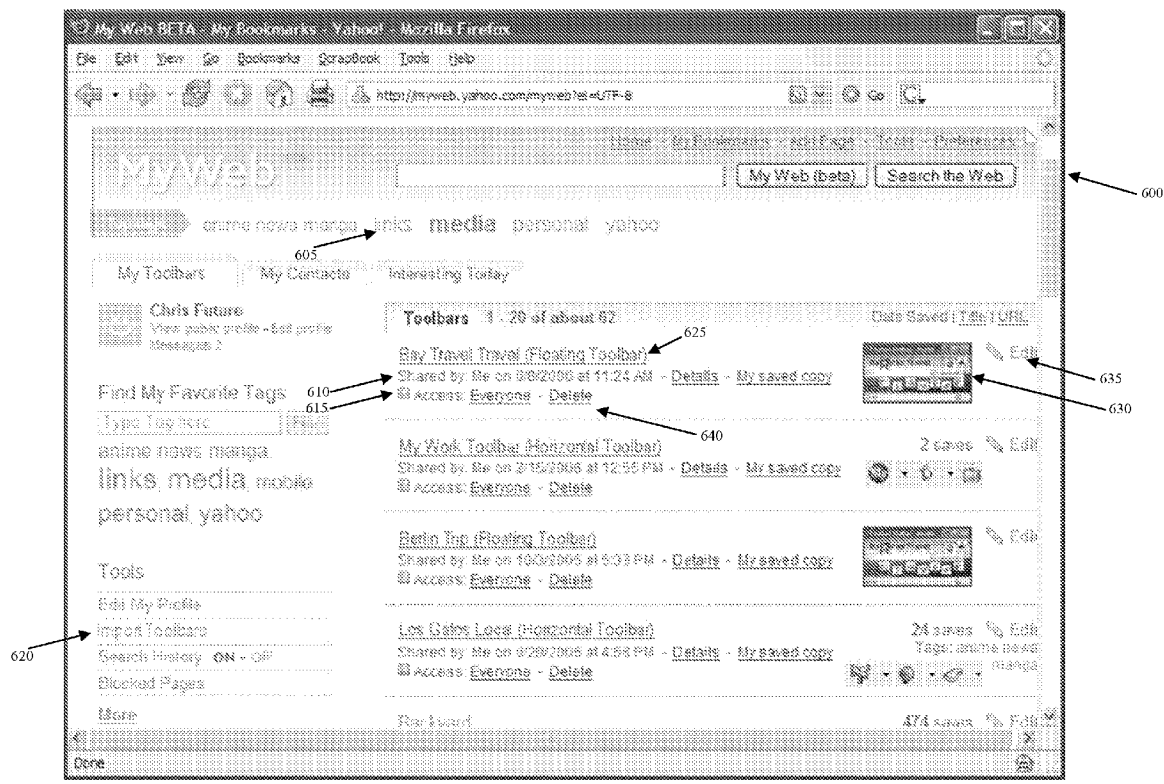
FIG. 6 is an example illustrating an exemplary user interface through which browser renderable toolbar customizations can be shared with other users.

In an embodiment, the skins created by a user can be shared with other users, and FIG. 6 is a screen capture illustrating an exemplary user interface through which this can be accomplished. In the illustrated embodiment, browser 600 loads a toolbar skin selection and sharing site. Such a site can include, without limitation, the name of a skin 625, a thumbnail 630 or other representation of the toolbar's appearance after the skin is applied, a link to a site through which the user can edit the skin 635, and an indication of the user who created or shared a specific skin 610. The toolbar skin selection and sharing site can also include access to an interface through which one or more stored skins can be deleted 640, and an interface through which a user can grant other users access to one or more toolbar skins 615. The toolbar skin selection and sharing site may further include a link which facilitates importing skins from traditional helper applications or from alternative sources 620. In an embodiment, skins may be defined and/or dynamically updated using Outline Processor Markup Language ("OPML"), Really Simple Syndication ("RSS"), or other such subscription technology. Depending on the user's age, gender, location, interests, or other such profile information, the toolbar skin selection and sharing site can recommend additional skins that may be of interest to the user.

Figure 7:
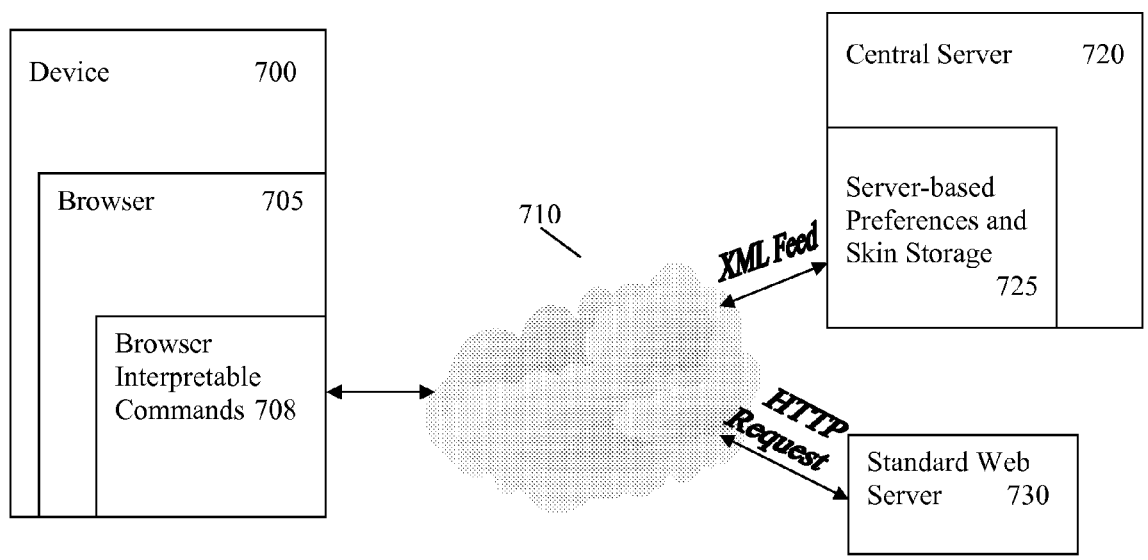
FIG. 7 is a block diagram illustrating an architecture through which a browser renderable toolbar can be distributed.

FIG. 7 is a block diagram illustrating an architecture through which a browser renderable toolbar can be distributed. In FIG. 7, browser 705 is running on device 700. Browser 700 can access server-based preferences and skin storage 725 stored on central server 720. Browser 705 can access such information through a variety of means, including public and private wired and/or wireless networks, which are illustrated in FIG. 7 as Internet 710. Browser 705 can transmit user identification information to central server 720, thereby facilitating access to a specific user's preferences, skins, and other such information. Central server 720 can then create a set of browser interpretable commands 708, which are transmitted to device 700, and ultimately rendered by browser 705 as a toolbar. As described above, such browser interpretable commands can be configured using any of a number of languages, including, without limitation, XML, HTML, JAVAScript, VBScript, and Flash. As browser 705 accesses additional content, such as content provided by standard web server 730, browser interpretable commands 708 are incorporated into browser 705's display, thereby facilitating access to the toolbar.

While detailed and specific embodiments of the browser renderable toolbar have been described herein, it will be apparent to those skilled in the art that various changes and modifications can be made therein without departing from the spirit and scope of the browser renderable toolbar. Thus, it is intended that the present disclosure cover these modifications and variations provided they come within the scope of any appended claims and/or their equivalents.

What is claimed is:

1. A method comprising:
   embedding code into a downloadable document comprising browser interpretable commands, the commands, when executed by at least one processor and interpreted by a browser running on a computing device, causing the browser to render, within a content display area of the browser, a user toolbar comprising functions of which are defined by said code, the functions providing additional functionality available which was not available prior to execution of said commands, said toolbar displayed without overlying anything displayed in the bounds of the user interface area of the browser prior to downloading and without overlying any content in the content display area of the browser by effectuating an initial modification of said content upon initially displaying said toolbar, the displayed toolbar, when displayed, creates a visual impression that the toolbar is an integrated part of the user interface of the browser;
   determining capabilities of said browser;
   incorporating the browser capabilities into the embedded code for use at least when loading the toolbar; and
   serving said document.

2. The method of claim 1, further comprising:
   receiving identification information from a user;
   performing user authentication based on the received identification information to determine an appropriate user account associated with the user; and,
   incorporating preferences associated with the appropriate user account into the downloadable document.

3. The method of claim 2, wherein the preferences associated with the appropriate user account comprise at least a set of favorite web sites.

4. The method of claim 1, further comprising:
   determining capabilities of a device on which the browser is operating; and, incorporating the device capabilities into the embedded code.

5. The method of claim 4, wherein the incorporating comprises omitting a subset of the embedded code.

6. The method of claim 1, wherein the incorporating comprises omitting a subset of the embedded code.

7. The method of claim 1, wherein the browser interpretable commands comprise commands written in XML.

8. The method of claim 1, wherein the browser interpretable commands comprise commands written in AJAX.

9. The method of claim 1, wherein the browser interpretable commands comprise instructions for facilitating searching of network-accessible documents.

10. The method of claim 9, wherein the network-accessible documents comprise documents accessible via the Internet.

11. A method comprising:
determining a set of toolbar preferences;
defining browser interpretable commands, wherein the browser interpretable commands, when interpreted by a browser, cause the browser to render a toolbar configured according to helper application preferences within a browser content display area, and wherein the browser interpretable commands, when interpreted by the browser on the device, cause the browser to incorporate the toolbar into the content display area as additional content is displayed by the browser by modifying previously displayed content in the content display area, the toolbar providing additional functionality to the browser which was not available prior to interpretation of said commands, the toolbar, when displayed, creates a visual impression that the toolbar is an integrated part of a user interface of the browser;
determining capabilities of the browser;
modifying the browser interpretable commands based on the browser capabilities; and
transmitting the browser interpretable commands to a device.

12. The method of claim 11, further comprising:
receiving identification information from a user;
performing user authentication based on the received identification information to determine an appropriate user account associated with the user; and,
modifying the set of toolbar preferences based on preferences associated with the appropriate user account.

13. The method of claim 12, wherein the user authentication step is repeated at least once if the user authentication step fails, and wherein a default user account is utilized when authentication subsequently fails.

14. The method of claim 11, further comprising:
determining capabilities of the device; and,
modifying the browser interpretable commands based on the device capabilities.

15. The method of claim 11, wherein the browser interpretable commands comprise commands written in XML.

16. The method of claim 11, wherein the browser interpretable commands comprise commands written in AJAX.

17. The method of claim 11, wherein the helper application preferences comprises a set of favorite web sites.

18. The method of claim 11, wherein the browser interpretable commands comprise instructions for facilitating searching of network-accessible documents.

19. The method of claim 18, wherein the network-accessible documents comprise documents accessible via the Internet.

20. Browser interpretable commands for implementing a helper application tangibly encoded on a computer readable storage medium, the browser interpretable commands being executed by a computing device, comprising:
a set of commands defining the appearance of the helper application;
a set of commands defining a plurality of user interface elements; and
a set of commands whereby the browser renders the helper application as part of each subsequent page displayed by the browser, the helper application providing additional functionality available which was not available to the browser prior to rendering of the helper application, wherein the rendering of the helper application is based upon the capabilities of the browser, wherein the helper application effectuates a display of an element in a content display area of the browser that when displayed creates a visual impression that the element is an integrated part of a user interface area of the browser, said element display comprising modifying displayed content in the display area to effectuate display of the element without overlaying the displayed content.

21. The browser interpretable commands of claim 20, wherein the appearance definition comprises at least one background image.

22. The browser interpretable commands of claim 20, wherein each user interface element definition comprises at least one image.

23. The browser interpretable commands of claim 22, wherein each user interface element definition further comprises at least one of the set of a URL and additional browser interpretable commands.

24. A method of controlling an Internet browser content display area on a display of a device, and enabling a user of the device and Internet browser to access and navigate the Internet and to receive and display one or more Web pages from one or more Internet sites, including the display of a Web page from a predetermined Internet site, the Internet browser having a bounded user interface area, the Internet browser further having a bounded content display area for displaying Web pages, the content display area being a separate area from the user interface area of the browser, said method comprising the steps of:
(a) providing, at the predetermined Internet site, access to a browser interpretable web page for generating an Internet browser toolbar; and
(b) downloading from the predetermined Internet site said web page, wherein said web page, when interpreted by the browser, adjusts the bounds of the content display area if necessary and causes the display, within the bounds of the content display area, of a user toolbar that, by virtue of the web page, is added to, appears in and remains entirely within the bounds of the content display area without overlaying anything that was displayed in the bounds of the user interface area of the browser prior to downloading and without overlying any content in the content display area by effectuating an initial modification of said content upon initially displaying said toolbar, said user toolbar providing additional functionality that is not part of the Internet browser prior to download available to the user after download, such that once the user toolbar is displayed the user toolbar remains displayed within the bounds of the content display area and said additional functionality remains available to the user regardless of a subsequent Internet site to which the Internet browser is caused to navigate after download, the display of the user toolbar based upon capabilities of the browser, the displayed toolbar, when displayed, creates a visual impression that the toolbar is an integrated part of the user interface area of the browser.

25. The method of claim 24, wherein the user toolbar comprises a toolbar user interface element and wherein the user toolbar is customizable by the user to provide user-selected functionality in the user toolbar.

26. The method of claim 25, wherein the toolbar user interface element is a toolbar button.

27. The method of claim 25, wherein the browser user interface area also comprises an address window in which a user can enter a web site addresses to which the user desires the browser to navigate, and wherein the toolbar user interface element is a search window, independent of the address window and independent of any search capability of the browser prior to download of the web page, which search window enables the user to enter a search term in the search window and initiate a search at the predetermined Internet site or another Internet site regardless of the Internet site to which the device is connected via the browser at the time the search is initiated or what web site address is present in the address window at the time the search is initiated.

28. The method of claim 24, further comprising the step of making available for downloading by the predetermined Internet site additional information specific to the user of the device and Internet browser, for defining all or part of the user toolbar, and wherein all or part of the display of the user toolbar is dependent upon the downloaded additional information.

29. A browser interpretable document for rendering by an Internet browser running on a computing device and displayed on a display of the device, the Internet browser facilitating connection between the device and one or more Internet sites including a predetermined Internet site, the Internet browser comprising a defined user interface portion and a defined content display portion, the Internet browser further facilitating displaying on a display of the device and in the defined content display portion one or more Web pages from the one or more Internet sites, including displaying of Web pages from the predetermined Internet site, comprising browser interpretable commands, whereby said Internet browser content display portion, after being enabled with new functionality via navigation to and download of the browser interpretable document from said predetermined Internet site and interpretation of the browser interpretable commands, comprises a persistent user toolbar which does not overly anything displayed in the user interface portion prior to the user toolbar being enabled through modification of content displayed in the content display portion, the persistent user toolbar is displayed so as to create the visual impression that the user toolbar is an integrated part of the Internet browser user interface, the user toolbar providing additional functionality not available to the browser prior to download, said additional functionality remains to the user regardless of which one of said one or more Internet sites the device is connected to via the Internet browser, the display of the persistent user toolbar based upon capabilities of the browser.

30. The Internet browser as recited by claim 29, wherein said user toolbar comprises a user interface element, and wherein the user interface element is customizable by the user.

31. The Internet browser as recited by claim 30, wherein said user interface element is a toolbar button.

32. The Internet browser as recited by claim 30, wherein the browser also contains an address window in which a user can enter web site addresses to which the user desires the browser to navigate, and wherein the user interface element is a search window, independent of the address window and independent of any search capability provided as part of said Internet browser, which search window enables the user to initiate a search at the predetermined Internet site or another Internet site regardless of the Internet site to which the device is connected via the browser at the time the search is initiated or what web site address is present in the address window at the time the search is initiated.

33. The Internet browser as recited by claim 30, wherein said user interface element comprises an AJAX-based set of commands that enables user customization of at least said user interface element.

34. The Internet browser as recited by claim 29, wherein said user toolbar periodically re-establishes a connection to the predetermined Internet site while the Internet browser is activated to receive additional information, specific to the user of the device and Internet browser, from the predetermined Internet site, and wherein all or part of said user toolbar is dependent upon the additional information, and wherein said connection occurs independent of any web page to which the user has navigated and independent of any home page to which the browser is programmed to navigate upon activation of the browser.

35. A system comprising:
a server, said server comprising a web page comprising browser interpretable instructions which are accessible over the Internet by a user of a device, wherein the web page comprises instructions for controlling a browser content display area; and
said web page further comprising browser interpretable instructions interpretable by an Internet browser, said Internet browser having a bounded web content display area, the Internet browser further having a bounded user interface area, the content display area being separate from the user interface area of the browser, said browser interpretable instructions, when said web page is interpreted, causing the display, within the bounds of the browser web content display area, of a user toolbar that, by virtue of its being downloaded, appears in and remains entirely within the bounds of the browser web content display area without overlaying content displayed in the content display area by modifying said content upon initial display of said content based on display of the user toolbar, said user toolbar providing additional functionality that is not part of the Internet browser prior to download available to the user after download, such that once the user toolbar is displayed said additional functionality remains available to the user regardless of a subsequent Internet site to which the Internet browser is caused to navigate after download, the display of the persistent user toolbar based upon capabilities of the browser, the displayed toolbar, when displayed, creates a visual impression that the toolbar is an integrated part of the user interface area of the browser.

36. The system as recited by claim 35, wherein said downloadable browser interpretable instructions cause a user interface element to be displayed as part of said user toolbar.

37. The system as recited by claim 36, wherein said user interface element enables a user of the device to customize the user toolbar and comprises instructions written in AJAX.

38. The system as recited by claim 36, wherein said user interface element enables a user of the device to customize the user toolbar.

39. The system as recited by claim 36, wherein said user interface element is a toolbar button.

40. The system as recited by claim 36, wherein said browser, has an address window and wherein said user interface element is a search window that enables a user of the device and Internet browser to initiate a search at a predetermined Internet site or another Internet site regardless of the Internet site to which the device is connected at the time the search is initiated and regardless of any address present in the address window at the time the search is initiated.

41. The system as recited by claim 36, wherein the browser interpretable instructions periodically re-establish a link between the device and the predetermined Internet site to receive additional information from the predetermined Internet site for defining all or part of a user interface element.

* * * * *